July 5, 1938.　　　T. W. FOOTE　　　2,122,565
CHAIR IRON
Filed Feb. 15, 1936　　　8 Sheets-Sheet 2
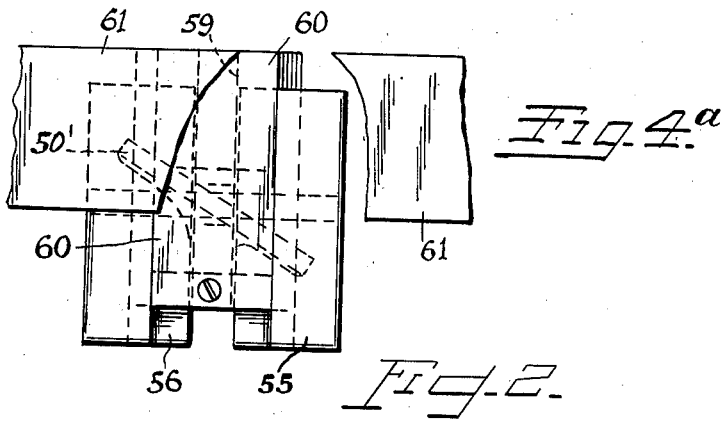
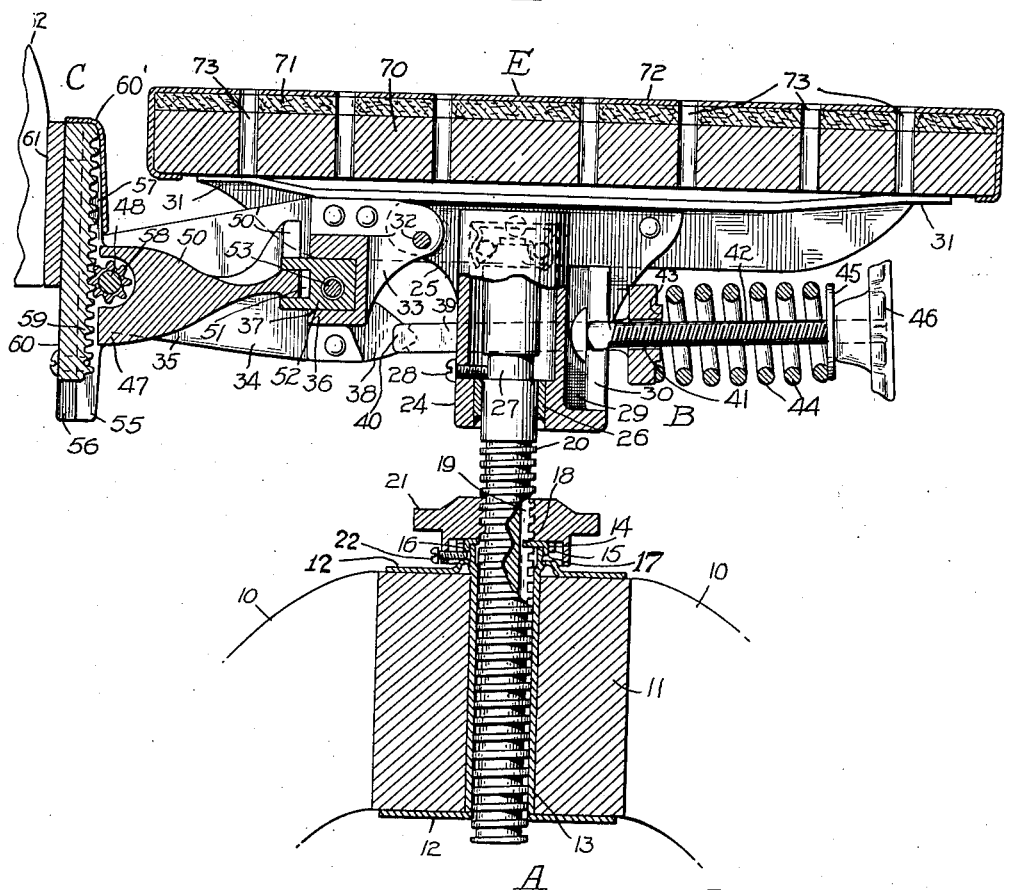
Thomas W. Foote
INVENTOR

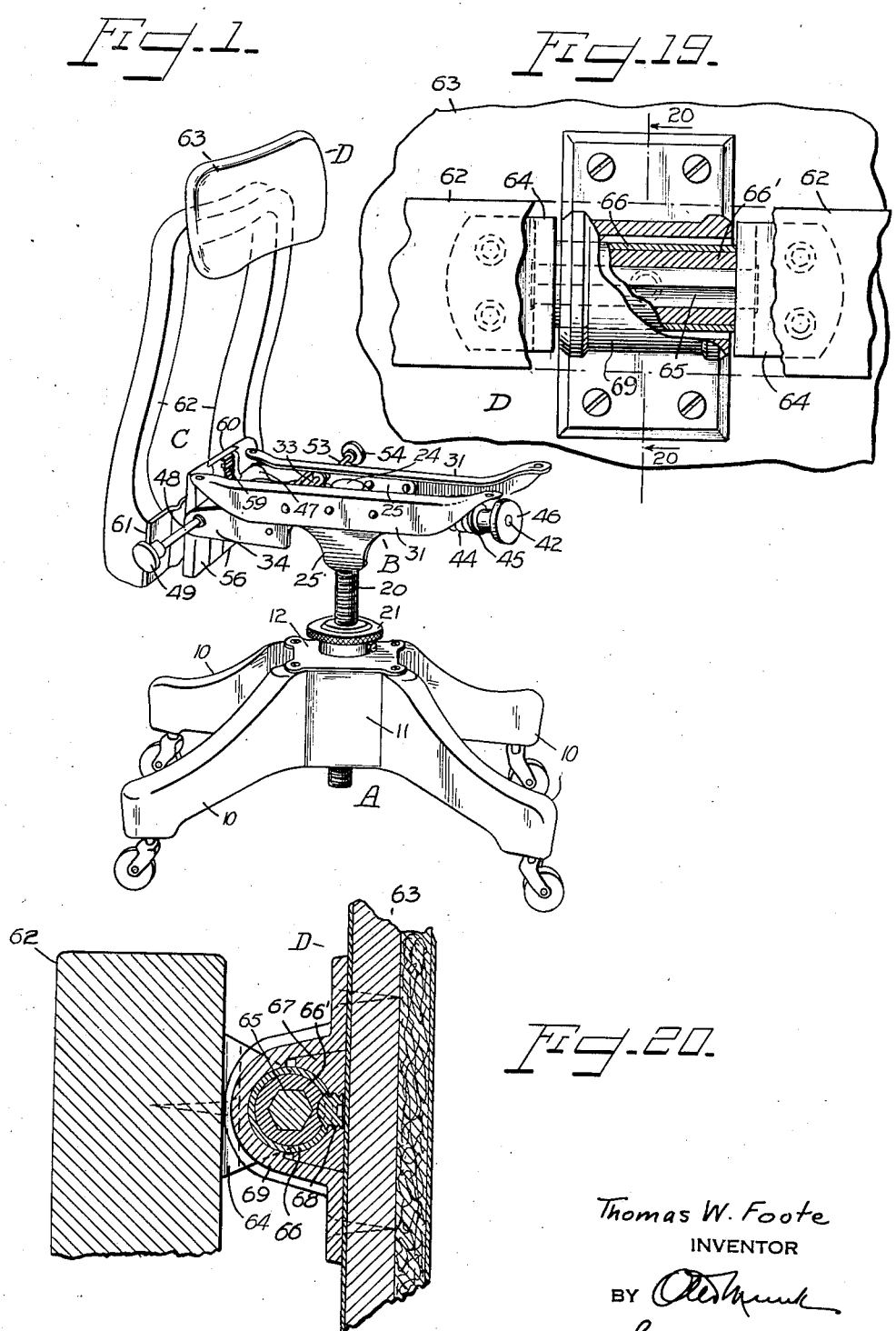

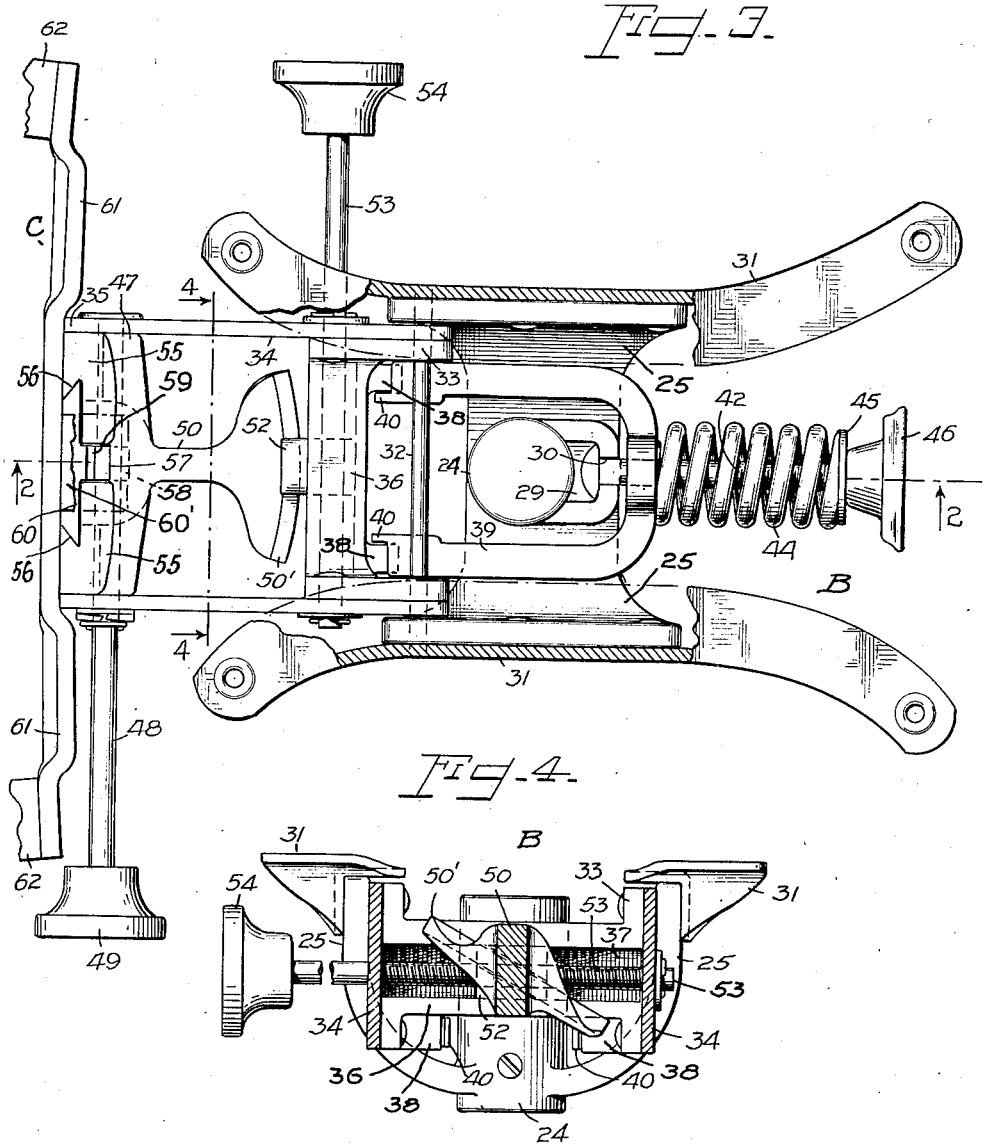

July 5, 1938.   T. W. FOOTE   2,122,565
CHAIR IRON
Filed Feb. 15, 1936   8 Sheets-Sheet 4
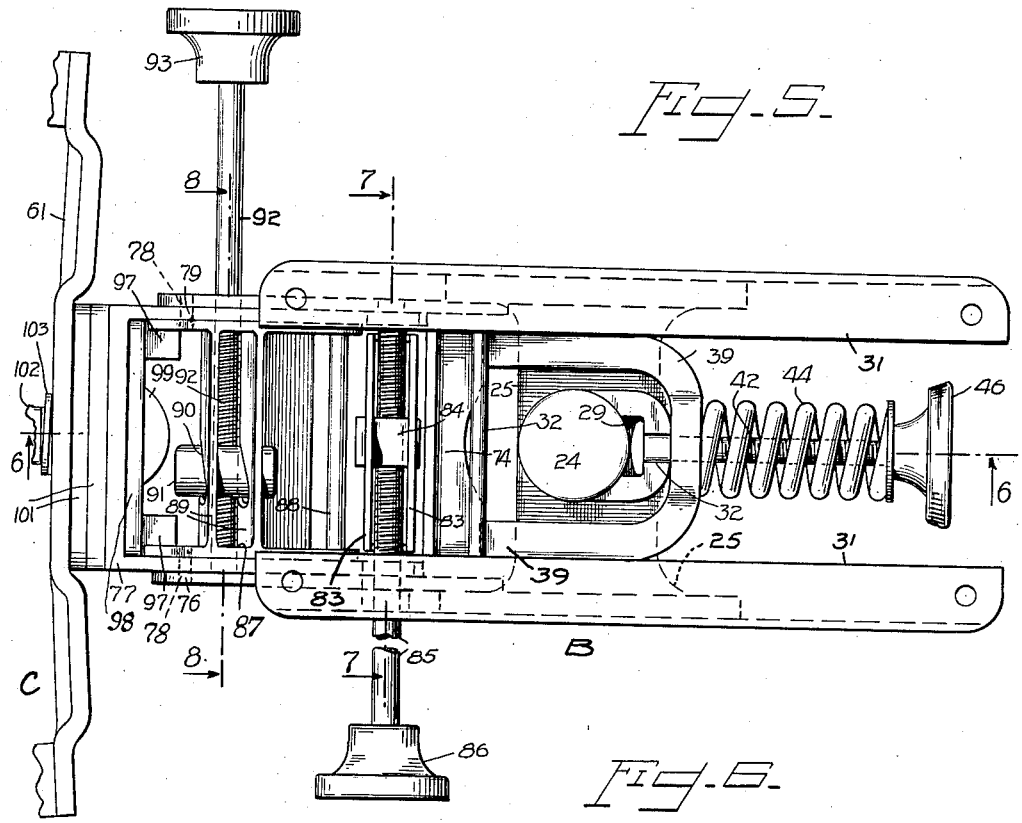
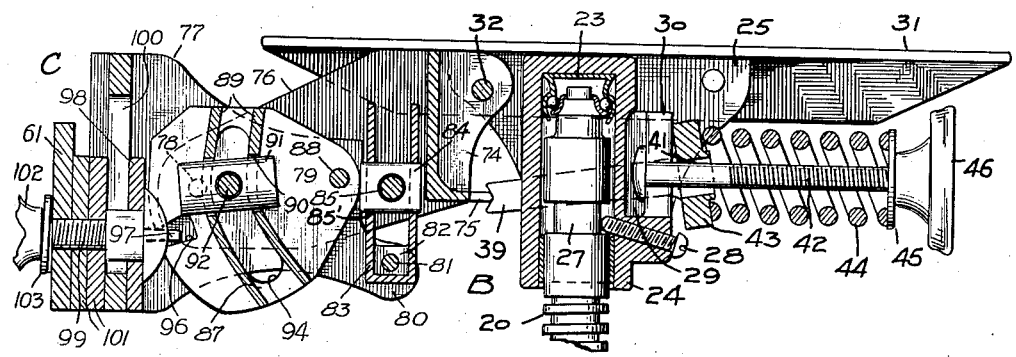
Thomas W. Foote
INVENTOR
BY
his ATTORNEY July 5, 1938.　　　　T. W. FOOTE　　　　2,122,565
CHAIR IRON
Filed Feb. 15, 1936　　　8 Sheets-Sheet 5
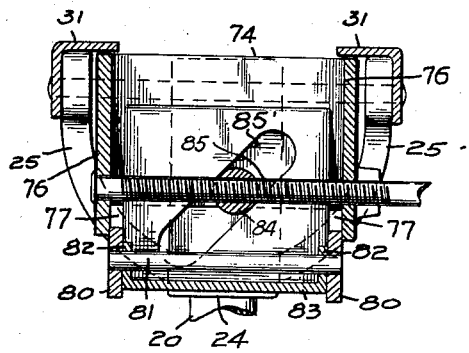
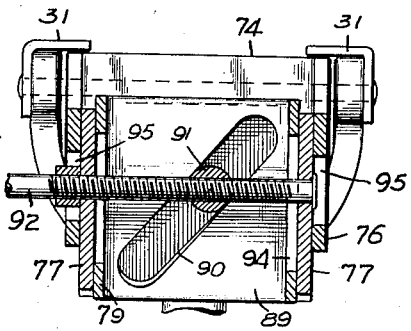
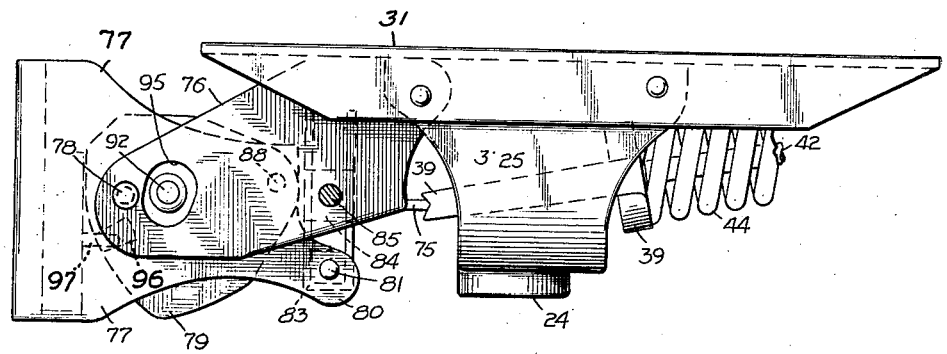
Thomas W. Foote
INVENTOR
BY
ATTORNEY

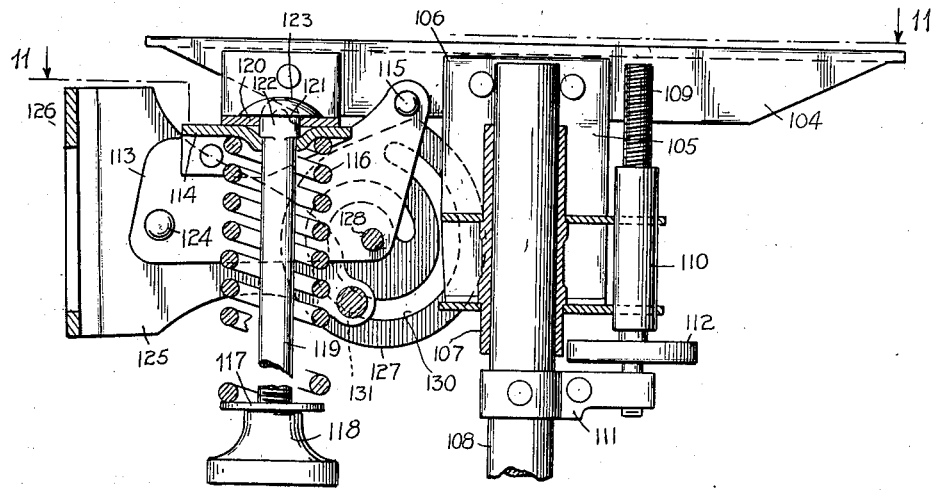
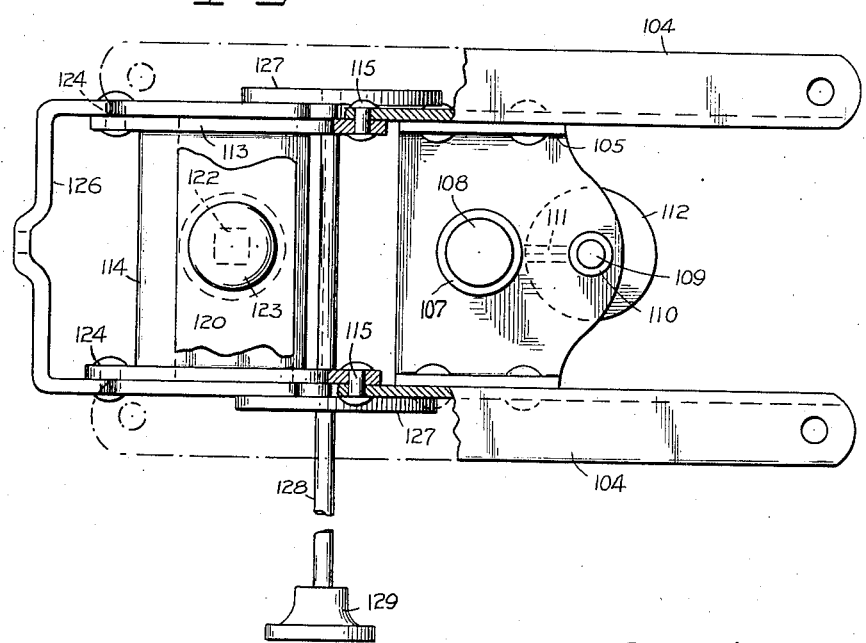

July 5, 1938. T. W. FOOTE 2,122,565
CHAIR IRON
Filed Feb. 15, 1936 8 Sheets-Sheet 7
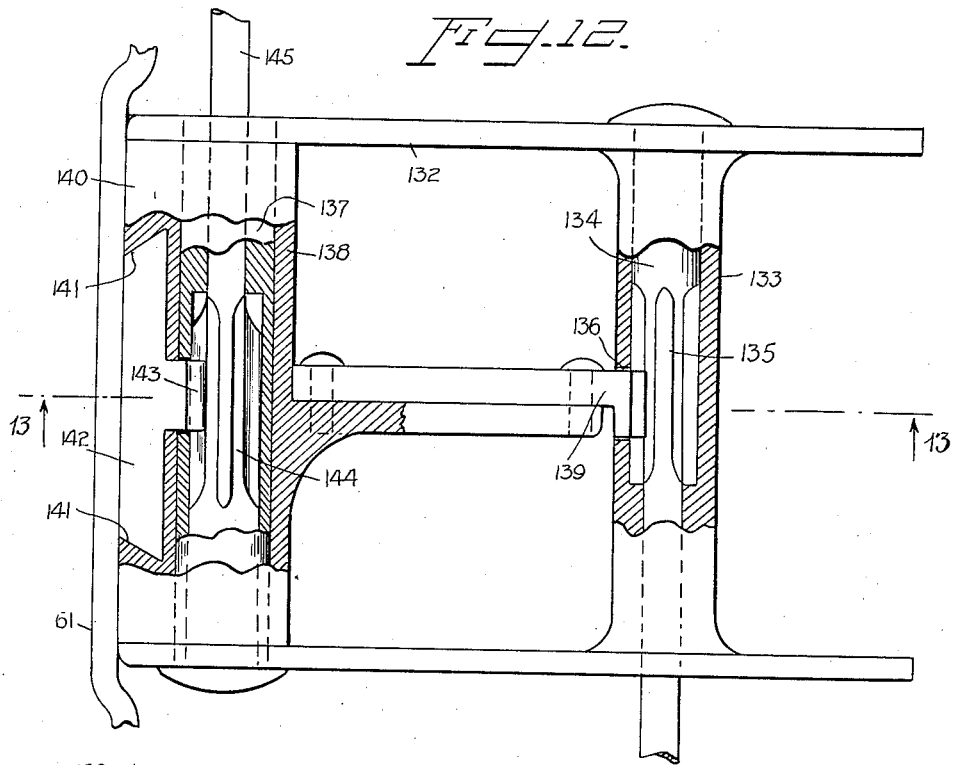
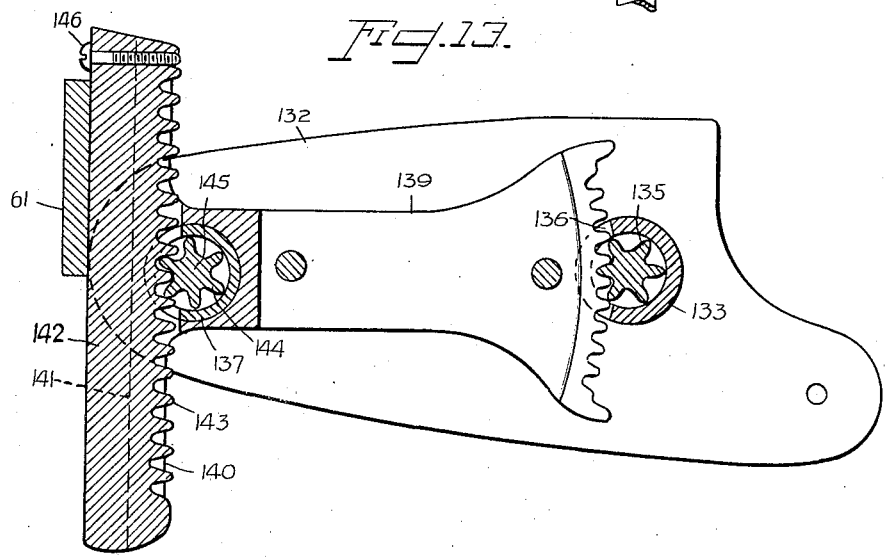
Thomas W. Foote
INVENTOR
BY
ATTORNEY.

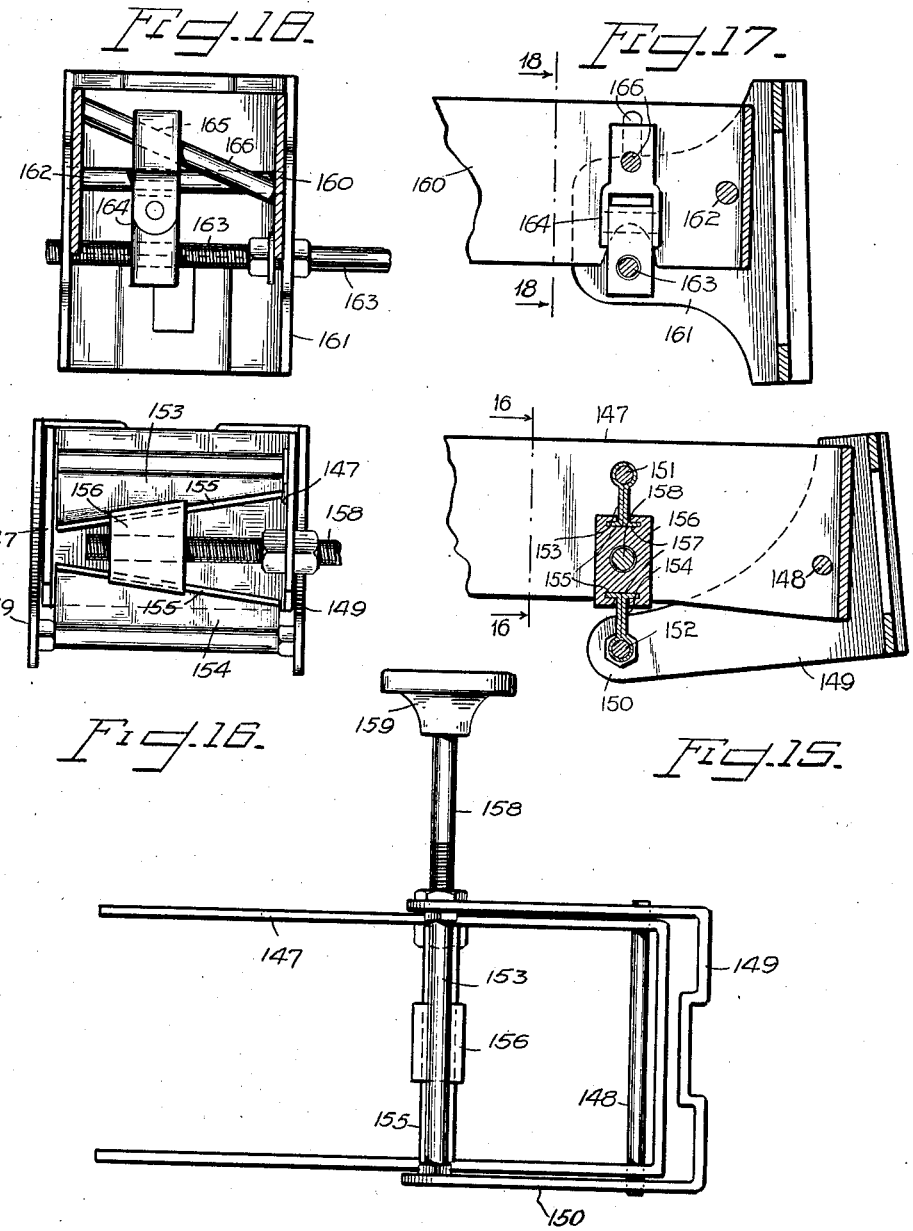

Patented July 5, 1938

2,122,565

UNITED STATES PATENT OFFICE 2,122,565

CHAIR IRON

Thomas W. Foote, Cleveland, Ohio

Application February 15, 1936, Serial No. 64,040

12 Claims. (Cl. 155—157)

My invention relates generally to improvements in revolving and tilting chairs and has reference especially to the chair iron, seat therefor and back rest.

An object of this invention is to provide new and useful improvements in chair irons embodying in their construction means for resiliently supporting the back and for adjusting the tilt thereof to the individual needs of the user.

Another object of my invention is to embody in the chair iron construction certain means for adjusting the elevation of the back.

A still further object of the present invention is to improve the construction of the seat used particularly in chairs of this character, by perforating the seat, its felt padding and covering.

And a still further object of my invention is to provide a self adjustable hinge connection for mounting the back rest on the back of a chair of this character.

I accomplish these objects by means of the various combinations and arrangements of parts hereinafter described, set forth in the appended claims and illustratively exemplified in the accompanying drawings, in which, Figure 1 is a side elevational view of a chair embodying my improved features;

Figure 2 is a substantially longitudinal sectional view of a chair iron, seat and supporting pedestal taken on lines 2—2 of Figure 3;

Figure 3 is a plan view of the chair iron;

Figure 4 is a substantially transverse sectional view taken on lines 4—4 of Figure 3;

Fig. 4a is a rear view of the chair iron and chair back, the latter being partly broken away;

Figure 5 is a plan view of a chair iron showing a modified tilting adjustment mechanism;

Figure 6 is a substantially longitudinal sectional view taken on lines 6—6 of Figure 5;

Figure 7 is a substantially transverse sectional view of the tilting mechanism taken on lines 7—7 of Figure 5;

Figure 8 is another substantially transverse sectional view taken on lines 8—8 of Figure 5;

Figure 9 is a side elevational view of the chair iron according to Figures 5 to 8;

Figure 10 is a substantially longitudinal sectional view of still another modified chair iron;

Figure 11 is a sectional view of the same taken on lines 11—11 of Figure 10;

Figure 12 is a plan view of a chair iron and its back tilting mechanism according to a still further modification;

Figure 13 is a substantially longitudinal sectional view taken on lines 13—13 of Figure 12;

Figure 14 is a plan view of a chair iron and a modified back tilting mechanism;

Figure 15 is a longitudinal sectional view taken on lines 15—15 of Figure 14;

Figure 16 is a substantially transverse sectional view taken on lines 16—16 of Figure 15;

Figure 17 is a substantially longitudinal sectional view of a modified tilting mechanism;

Figure 18 is a transverse sectional view of the same taken on lines 18—18 of Figure 17;

Figure 19 is a rear elevational view of the upper portion of the chair back and back rest;

Figure 20 is a substantially longitudinal sectional view taken on lines 20—20 of Figure 19.

Referring to the drawings and particularly to Figures 1 to 4, the present invention comprises a chair base A upon which is mounted a chair iron B carrying a back C and back rest D and seat E.

Chair base A

The chair base comprises four radially disposed legs 10, a center block 11 and top and bottom plates 12, which are connected to the ends of a cylindrical bearing 13 projecting through the bore in the base proper. The upper end of the bearing 13 is flared outwardly to form a flange 14 having oppositely disposed radial open ended slots 15. A washer 16 having downwardly disposed teeth 17 is arranged over the flange 14 and its teeth engage in the slots 15 to prevent turning of the washer. The washer is further provided with an internal tooth 18 to engage in a longitudinal slot 19 cut in the side of a splindle 20. The spindle is externally threaded and provided with a screw cap 21 having a skirt portion embracing the flange 14 and a set screw 22 engaging under the flange to prevent separation of the screw cap 21 and flange when the former is rotated to raise and lower the spindle 20 in the chair base.

Chair iron B

The upper portion of the screw spindle 20 is unthreaded and tapered at its end, which is grooved to accommodate a ball bearing cage 23 fixed in the upper end of the bore of a bearing block 24, see Figure 6. The bearing block 24 is part of a U-shaped casting 25 and consists of an upright cylindrical wall closed at its upper end over the case 23 and a bushing 26 disposed adjacent its lower open end to bear against the unthreaded section of the spindle 20. The spindle is further provided with a groove 27 just above the unthreaded section to receive the inner end of a set screw 28 adjustable in the side of the block 24 to project into the groove 27 and prevent the spindle from being withdrawn. The block 24 projects upwardly midway between the two arms of the casting 25 and on its face, directed towards what is the front of the chair is a pocket 29 formed by integral side walls and a bottom wall, the side walls turning towards each other to provide an open ended upright slot 30.

Mounted upon the upper ends of the arms of the casting 25 are outwardly curved angle irons 31 which form the spider arms supporting the seat C.

The tilting arrangement supporting the chair back C, comprises, in this particular embodiment, a fixed shaft 32, which runs transversely to the iron, and which is mounted at its ends in the arms of the casting 25 rearwardly of the bearing block 24. Pivotally mounted on the shaft 32 are the arms 33 of a rocker or bracket, which consists of outside plates 34 with rearwardly projecting arms 35 and a bridge piece 36, the mid portion of which is provided with a guideway 37 open towards the rear. The lower portion of the front of the bridge piece 36 is provided with forwardly projecting teeth 38 arranged one adjacent each end and below the shaft 32. The upper sides of the bracket in normal position abut the under sides of the lateral flanges of the seat angle irons 31 and in order to maintain sufficient tension upon the bracket to bring about this condition, a U-shaped strap 39 is used, the same being arranged with its arms straddling the upright bearing block 24 and its closed end disposed in front of the pocket 29. The free ends of the arms are grooved to receive and bear upon the teeth 38 and are provided with projections 40 on their inner sides to embrace the inner sides of the teeth 38 to prevent the strap 39 from becoming displaced.

The closed end of the strap 39 is enlarged and provided with an axial opening 41 to accommodate a bolt 42, the head of which is disposed in the pocket 29 and the threaded stem of which projects forwardly under the seat C. The outer wall of the closed end of the strap 39 is stepped up slightly to form a centering seat 43 for one end of a helical spring 44, which embraces the bolt 42 and which is tensioned at its outer end by a washer 45 and hand wheel 46 adjustable over the free end of the bolt 42.

In addition to the resilient support for the tilting chair back an adjustment thereof is provided giving the back any desired inclination relative to the above described tilting mechanism. This adjustment is accomplished by pivotally mounting a back carrying bracket 47 between the extreme rearward ends of the arms 35, the pivotal connection being effected by a rotary shaft 48 and hand wheel 49 journalled in the arms 35. The bracket 47 comprises a cylindrical portion, the bore of which accommodates the shaft 48 and a forwardly projecting follower wing 50 terminating in a flared portion inclined with respect to the horizontal plane and being provided with a track 50' closely adjacent the open side of the guideway 37. The track 50' is guided in an inclined groove 51 of an adjustable guide 52 which traverses the guideway 37 over a threaded spindle 53. The spindle 53 is journalled in the ends of the bracket consisting of the bridge piece 36 and plates 34 and runs axially of the guideway 37, the outer end of the spindle 53 at one side having a hand wheel 54.

The bracket 47 on its rear face carries spaced lugs 55 provided with opposite V-shaped grooves 56 to form a vertical guideway. Midway the length of the cylindrical portion the bracket is grooved to afford a passage 57 traversing the bore in the said cylindrical portion. A pinion gear 58 is keyed to the rotary shaft 48 and projects into the passage 57 to mesh with a rack 59 guided therein. The rack 59 is integral with a slide plate 60 having beveled sides to slide vertically in the V-shaped grooves 56 (see Fig. 4a). A shield 60' is carried by the plate 60 to cover the rack 59 when the latter projects above the seat and to act as a stop to limit downward motion of the plate 60.

To adjust the inclination of the back supporting bracket 47 the hand wheel 54 and spindle 53 are rotated shifting the guide 52 transversely of the iron and in so doing the track 50' of the follower 50 is raised or lowered and with it the bracket 47 which turns on the shaft 48 and causes the lugs 55 to turn about the latter as a center to change the inclination.

Finally vertical adjustment of the back itself may be effected by rotating the hand wheel 49 and the pinion 58, the latter raising and lowering the rack 59 and the plate 60 which carries the back C.

Chair back C

Referring now to the chair back, the latter comprises a slightly curved plate 61, arranged upright on one of its longitudinal sides and provided with a straight mid portion which is integrally attached to the plate 60. The extreme outer ends of the plate 61 carry the lower ends of an inverted U-shaped wood piece 62 constituting the back frame of the chair.

Back rest D

The back rest according to the present embodiment is mounted on the closed upper end of the back frame 62 and comprises a padded laterally curved member 63, which is under tension in its mountings to tilt slightly forward at its upper edge.

The mountings for the rest consists of two spaced angle brackets 64 (see Fig. 20) mounted on the closed end or cross piece of the frame. The outward arms of the brackets carry a polyangular bar 65 which is fixed in the arms and about which is mounted a resilient body 66', preferably rubber, held under extreme pressure within a cylindrical shell 66. The shell 66 may turn with respect to the bar 65 by means of a follower 67 consisting of a plate having a semi arcuate groove embracing the shell 66 and carrying a set screw 68 which projects into an opening in the shell. The follower 67 is arranged between the sides of the strap 69 which embraces the shell 66 and is attached to the back of the back rest 63.

Chair seat E

Arranged upon the angle irons 31 of the seat spider is the seat proper which consists of a suitably shaped foundation board 70, a layer of padding or filler 71 and covering 72. The seat is further provided with a plurality of uniformly spaced vent holes 73 which project through the wood filler and covering.

Referring to the chair iron, illustratively exemplified in Figures 5 to 9, this embodiment utilizes the casting 25, strap 39, spring 44, bolt 42 and hand wheel 46 and the fixed shaft 32. The bracket 74 mounted upon the shaft 32 differs from the corresponding part of the preceding figures in that its bridge portion is simply an angle plate having its lower lateral flange provided with tooth-like projections 75 upon which the recessed free ends of the strap 39 are adapted to bear. Side plates 76 form integral parts of the bracket 74 and project rearwardly to pivotally support a chair back bracket 77 by means of stub pins 78 projecting from the plates 76 into openings in side pieces of the bracket 77.

The forward ends of the side walls or plates of the bracket 77 are provided with projections 80 extending forwardly from the lower corners to support a fixed shaft 81 therebetween. The shaft 81 projects through the end pieces 82 and adjacent the closed end of an upright U-shaped cam plate 83, which extends between the plates 76. The cam plate 83 is pivotally connected with the back bracket 77 through the shaft 81 and the plate is raised and lowered by means of cam follower 84 riding in parallel inclined slots 85' of the cam plates 83. The cam follower 84 is provided with a threaded bore disposed transversely thereof to traverse a threaded spindle 85 which is rotatably mounted in the side plates 76 of the bracket 74, one end of the spindle projecting outwardly at the side of the chair iron to receive a hand wheel 86. In operation, adjustment of the cam follower 84 along the spindle 85 will cause the cam plate 83 to be raised or lowered and with it the back support 77, which will swing about its pivots 78.

The back support 77 carries means for adjusting the elevation of the back with respect to its tilting arrangement, such means in the present modification comprising a cam having side plates 87 pivotally supported on a fixed shaft 88 disposed between the side pieces 79 of the back supporting bracket 77 and provided with rearwardly arched parallel cam plates 89 projecting between the plates 87. The cam plates 89 have parallel inclined cam slots 90 to accommodate a cam follower 91 which is adjustable along a threaded spindle 92 rotatably carried by the back supporting bracket sides 79 and provided with a hand wheel 93 at one end. The side walls 87 are arcuately slotted at 94 between the cam plates 89 to accommodate the intermediate portions of the spindle 92. The side plates 76 are also slotted at 95 to accommodate the projecting portions of the spindle 92 and allow relative movement thereof with respect to the bracket 74.

The rear free ends of the side walls 87 of the cam are provided with recesses 96 which receive the teeth 97 of a vertically adjustable plate 98 disposed between the sides of the bracket 77 and provided with a clamp screw 99 which projects rearwardly through an upright slot 100 in closed back wall of the bracket 77 and carries two slide plates 101 and a hand wheel 102 and lock washers 103. The plates 101 are integral with the cross piece 61 of the chair back. In operation the cam follower 91 is moved through the cam slots 90 to swing the cam about its pivotal axis or shaft 88 and the teeth 97 engaged in the recesses 96 are adjusted vertically and with them the plates 98 and 101, clamp screw 99 and cross piece 61 of the chair back.

Referring now to the chair iron illustrated in Figures 10 and 11, spider irons 104 of the seat are rigidly connected to the upper ends of the arms 105 forming a U-shaped strap 106, which carries an upright cylindrical bearing 107 for the swivel spindle 108 of the chair base. The strap 106 and spider irons 104 are raised and lowered with the seat by means of a screw spindle 109 turning in the threaded bore of an upright block 110 integral with the strap 106. The screw spindle 109 is carried on a bracket arm 111 held on the swivel spindle 108 and is rotated to adjust the elevation of the seat by a hand wheel 112 keyed to the spindle 109.

The back supporting members, in this modification, comprise side plates 113, bridge piece 114 attached at its ends to the plates and a pivotal connection 115 between each vertical flange of the spider arms 104 and the forward upper corner of each side plate 113. The back support is resiliently supported in its uppermost position by means of helical spring 116 seated at its upper end against the under side of the bridge piece 114 and at its lower end against a washer 117 and hand wheel 118 which is adjustable vertically over a bolt 119 projecting axially of the spring 116 and opening in the bridge piece 114. The back support is limited in its uppermost position by a tie plate 120 fixed at its ends to the vertical flanges of the spider irons 104 and having a square opening 121 in its mid portion to receive the squared shank 122 of the bolt 119, the latter having its head 123 resting upon the tie plate 20.

The rearwardly projecting ends of the side plates 113 carry pivot pins 124 upon which the side arms 125 of a U-shaped strap 126 are pivotally supported, the strap 126 being adapted to carry the back proper. Adjustment of the strap 126 about its pivotal axis to tilt the back is effected through a pair of cam plates 127 turning with a rotary shaft 128, which is journalled in the side plates 113 in the corner thereof below the pivotal axis 115, and which carries a hand wheel 129 at one end. The cam plates 127 are provided with corresponding spiral cam slots 130 in which followers 131 ride, the followers being arranged at the forward ends of the sides of the back strap 126, so that as the plates 127 are revolved the cam slots thereof will cause the forward ends of the back strap 126 to be raised or lowered about the pivotal axis of the pins 124. Thus the back supporting strap is tilted with respect to the resilient supporting elements 113, 114 for the back.

In Figures 12 and 13, the back supporting medium comprises a pivotally mounted bracket 132, which is resiliently supported by any one of the arrangements heretofore described, and which comprises side plates connected to the ends of a cylindrical tie block 133. The block 133 accommodates a shaft 134 in which gear teeth 135 have been cut, the teeth being accessible through a transverse slot 136 in the block. One end of the shaft 134 carries a hand wheel (not shown). The rear ends of the bracket 132 carry a cylindrical bearing 137 upon which is mounted the hub 138 of a segmental gear 139, the latter projecting forwardly and having its teeth moving through the slot 136 to mesh with the teeth 135. Spaced guide lugs 140 integral with hub 138 and projecting above and below the latter are provided with guide grooves 141 in which a plate 142 is vertically adjustable, the plate having a rack 143 projecting into a slot in the hub 138 and bearing 137 to mesh with a toothed portion 144 of a shaft 145 which is rotatably mounted in the bore of the bearing 137 and carries a hand wheel (not shown) at its outer end. A set screw 146 in the upper end of the rack 143 limits the latter from being lowered beyond a certain point.

Referring to the modification illustrated in Figures 14, 15 and 16, 147 denotes the U-shaped strap which is resiliently pivotally supported, like strap 126 in Figures 10 and 11, to hold the back upright and 148 designates a pivot rod carried by the side plates of the strap 147 closely adjacent the closed end thereof. A back supporting U-shaped strap 149 is pivoted upon the ends of the rod 148, the arms 150 of the strap 149 embracing the sides of the strap 147 and at their free ends a bearing rod 152 is mounted, the ends of the rod being fixed in the arms of the strap 149 below the first strap 147. Directly over the rod 152 is a second bearing rod 151 carried at its ends in the side plates of the strap 147. Mounted upon the rods 151 and 152 are guide jaws 153 and 154 respectively, the tracks 155 of which project towards each other at one side of the iron. A wedge block 156 with guideways 157 in its opposite sides to embrace the tracks 155 is adjustably mounted between the opposite inclined surfaces of the jaws 153 and 154 on a screw spindle 158 rotatably mounted in one side of the strap 147 and provided with a hand wheel 159 at its outer end. The wedge block 156 traversing the screw spindle 158 causes the jaws to move relatively to each other and the back supporting strap 149 to tilt to any desired inclination.

In Figures 17 and 18, the straps 160 and 161 are pivotally connected by the rod 162, as in the previous modification, but in this arrangement the screw spindle 163 is carried in the back supporting strap 161, beneath the first strap 160. One end of a universal coupling 164 traverses the screw spindle 163 and its other end is provided with an inclined bore 165 which moves over an inclined shaft or bar 166 carried at its ends in the side plates of the first strap 160. Movement of the coupling 164 along the spindle 163 and rod 166 causes the pivoted back supporting strap to tilt with respect to the first strap 160.

I claim:—

1. In a chair iron, the combination of a block to support a seat frame, a bracket pivoted on said block, spring means to hold the bracket in its normal position, a back support pivoted in said bracket and provided with an inclined track, and means adjustable transversely of the bracket and support to engage said track and adjust the inclination of the back support about its pivotal axis.

2. In a chair iron, the combination of a block to support a seat frame, a bracket having side arms and a cross member intermediate the ends of said arms, said bracket being pivoted on said block, a spring means arranged between said bracket and said block and being adjustably tensioned to yieldably hold the bracket in a predetermined position, a rotary threaded spindle disposed transversely in the bracket and carrying a guide means traversing the spindle, a chair back supporting member pivotally mounted on the arms of the bracket and provided with an inclined follower engaged in the guide means to be moved by the latter in its movement over the spindle and to adjust the inclination of the chair back supporting member about its pivotal axis.

3. In a chair iron, the combination of a block to support a seat frame, a bracket tiltably mounted on said block means to yieldably hold said bracket in a predetermined position, a back supporting member journalled in said bracket, adjustable means to change the inclination of said member, a rotary shaft arranged at the pivotal axis of said back supporting member and provided with a pinion, and a rack carrying a back adjustably mounted in said supporting member, said rack being in mesh with the pinion to effect the elevation of the back connection by rotary adjustment of said shaft.

4. A chair iron, as claimed in claim 2, including further a spindle mounted at the pivotal axis of the chair back supporting member and provided with a pinion, a slide plate guided in said back supporting member and provided with a rack in mesh with said pinion, whereby rotation of the latter will adjust the elevation of the plate, and chair back carried by said plate.

5. A swivel chair, comprising a chair base, a spindle projecting vertically from said base, a cylinder-shaped block rotatably supported on the upper end of said spindle, a chair iron rigid with said rotatable block, a tilting bracket pivotally mounted on said block rearwardly of the turning axis thereof, an adjustable spring means mounted on said block forwardly of the turning axis thereof, an intermediary member movably engaging the spring means forwardly of the turning axis of the block to transmit the tension of said spring to said bracket in order to keep the latter yieldably in a predetermined position, said intermediary member embracing said block and projecting rearwardly into engagement with said bracket, and supporting means for a back rest carried by the tilting bracket and adjustable with respect thereto.

6. A swivel chair, as claimed in claim 5, comprising further a ball-bearing between the upper end of said spindle and said cylinder-shaped block.

7. In a chair iron, the combination of a block to support a seat frame, a bracket pivoted on said block, spring means to hold the bracket yieldably in a predetermined position, a back support pivoted in said bracket, an inclined track and a guide having an inclined groove provided on said back support and in said bracket respectively, and means to adjust the track and the grooved guide relative to each other transversely of the bracket and support, whereby the back support is inclined about its pivotal axis.

8. In a chair iron, the combination of a block to support a seat frame, a bracket tiltably mounted on said block and provided with a rotary screw spindle disposed transversely therein, means to yieldably hold said bracket in a predetermined position, a back supporting member journalled in said bracket, an upright cam plate pivotally connected with said member and having an inclined cam slot adjacent said screw spindle, and a follower traversing the spindle and riding in said cam slot to raise and lower the cam plate and change the inclination of the back supporting member.

9. In a chair iron, the combination of a block to support a seat frame, a bracket tiltably mounted on said block and provided with a rotary screw spindle disposed transversely therein, means to yieldably hold said bracket in a predetermined position, a back supporting member journalled in said bracket, said back supporting member comprising two side plates and a rearwardly arranged cross piece, an upright U-shaped cam plate embracing the spindle said cam plate having its closed end pivotally connected to the open forward end of said back supporting member and its upright sides provided with parallel inclined cam slots, a follower traversing said spindle and riding in the cam slots, and means to adjustably mount a chair back on said back supporting member.

10. A chair iron, as claimed in claim 9, in which said means to adjustably mount the chair back, comprises a second cam element including a curved cam plate and being mounted in said back supporting member adjacent the open end thereof pivotally about an axis transverse of the side plates of said back supporting member, said curved cam plate being disposed transversely between said plates and provided with a cam slot disposed transversely of said chair iron and at an inclination to the horizontal plane, a follower engaged in said cam slot, a second screw spindle carried by said back supporting member transversely thereof and over which the follower is movable, and a back connecting plate adjustable in the closed end of the back supporting member and having a projecting lug to engage in a notch in the rear edge of said second cam element at the free end of the latter to translate the arcuate movement thereof into a vertical adjustment for the back connecting plate.

11. In a chair iron, the combination of a base, a block rotatably mounted on said base to support a seat frame, a bracket having side arms and a cross member intermediate the ends of said arms, said bracket being pivotally mounted on said block rearwardly of the turning axis thereof, and provided with laterally spaced forwardly directed projections, a U-shaped strap surrounding the block and seated at its ends on said projections, a bolt carried by the block forwardly of the turning axis thereof and projected through the closed end of the U-shaped strap, a spring embracing the bolt and bearing against the strap at one end, a hand wheel adjustable over said bolt and against the other end of the spring to tension the latter and yieldably support the bracket, a back support pivotally mounted on the arms of the bracket and provided with an inclined track, and guide means movable transversely of the bracket and engaged with said inclined track.

12. In a chair iron, the combination of a block to support a seat frame, a bracket tiltably mounted on said block and provided with a guideway, means to yieldably hold said bracket in a predetermined position, a guide in said guideway, said guide having an inclined groove therein, a screw spindle mounted transversely in the bracket and engaging the guide to cause the latter to traverse the guideway, and a back supporting member journalled in said bracket and provided with a follower having an inclined track riding in the grooved guide, whereby movement of the latter along said screw spindle will cause the back support to take an inclined position corresponding to the position of the track in the groove of the guide.

THOMAS W. FOOTE.